J. GRAY.
Sewing Machine.
No. 19,665.
2 Sheets—Sheet 1.
Patented March 16, 1858.
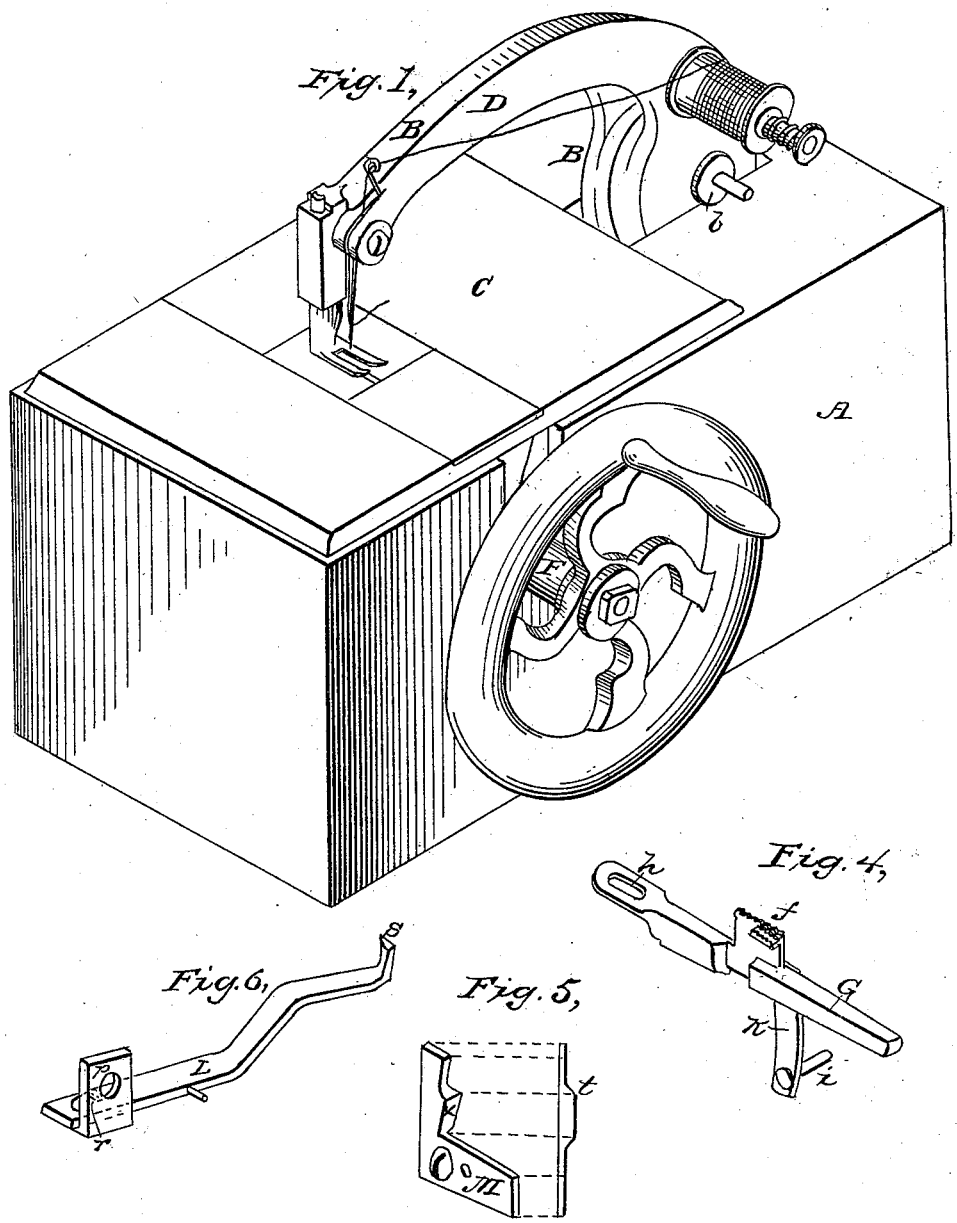

J. GRAY.
Sewing Machine.
No. 19,665.
2 Sheets—Sheet 2.
Patented March 16, 1858.
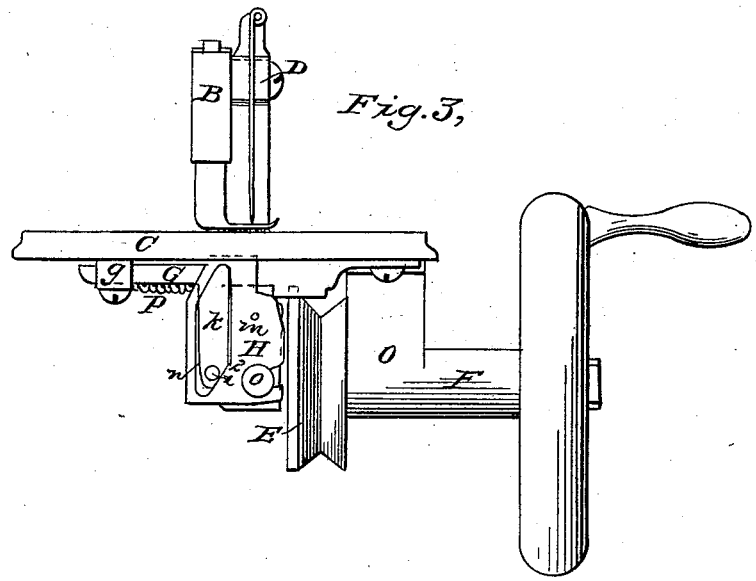

UNITED STATES PATENT OFFICE.

JOSHUA GRAY, OF BOSTON, MASSACHUSETTS, ASSIGNOR TO HIMSELF AND T. B. MACKAY, OF SAME PLACE.

IMPROVEMENT IN SEWING-MACHINES.

Specification forming part of Letters Patent No. 19,665, dated March 16, 1858.

*To all whom it may concern:*

Be it known that I, JOSHUA GRAY, of Boston, in the county of Suffolk and State of Massachusetts, have invented certain new and useful Improvements in Sewing-Machines, of which the following is a full, clear, and exact description, reference being had to the accompanying drawings, making part of this specification, in which—

Figure 1 is a view of my sewing-machine with its box or bed. Fig. 2 is a side elevation of the working parts without the box; Fig. 3, an end elevation of the same; Figs. 4, 5, and 6, details.

My invention consists in simple and efficient methods of operating the feed of the cloth or article being sewed and of moving the hook which forms the loop.

In the drawings, A is the box or bed, which supports the operating parts of the machine. B is the presser-arm, which is secured at $a$ to an arm, I, projecting down from the top plate, C. The needle-arm D is pivoted at $b$ to the arm B, and is vibrated by a cam-wheel, E, on the driving-shaft. F is a pin, $c$, on this cam-wheel, entering a slot, $d$, in the lower end of the arm. As these parts are similar to those now in use in other machines and form no part of my present invention, they need not be more particularly described.

The mechanism by which the feed of the material being stitched is effected and the length of stitch is regulated will now be described.

The pressure-foot slides in a box on the end of the arm B, and is held down (by a spring in the box) upon the table or plate C through a slot or opening, in which the needle plays, and through which slot the feeding-foot $f$, Fig. 4, rises and falls, and is moved horizontally in the following manner: Attached to the under side of the plate C is a block, $g$, in a suitable notch in which slides a bar, G, Fig. 4. The other end of this bar is supported by a screw attached to the plate C, which passes through a slot, $h$, in the bar, the bar being allowed a slight vertical play on the screw and in the notch in the block $g$. The feeding-foot $f$ is secured to this bar near the middle of its length, and rises through a slot in the plate C, the foot being cut away on one side to accommodate the needle. From the lower side of the bar G hangs an arm, $k$, from the lower end of which projects a pin, $i$. Secured to the lower end of the vibrating arm D, or the end which passes beneath the plate C, is a plate, H, which is pivoted at $m$, Fig. 3, to the end of the arm. This plate has cut in it a slot, $n$, with its ends inclined as at 1 and 2, in which slides the pen $i$, attached to the bar G. Thus as the plate H is raised and lowered by the vibrations of the arm D, the pin $i$, following the inclined edges of the slot $n$, causes the bar G to move back and forth horizontally beneath the plate C. The distance which the bar G is thus moved, and consequently the length of stitch or the amount of feed given at each vibration of the arm D, is regulated by turning the plate H on its pivot $m$ and securing it in position by a screw, $o$, which passes through a notch in the plate and secures it to the end of the bar B. The cam-wheel E, the edge of which is formed as in Fig. 2, presses against the lower edge of the bar G, and as the shaft F is revolved causes the bar to rise and fall vertically. Thus at each revolution of the hand-wheel on the shaft F the foot $f$ is pressed up against the article being stitched, and moved along horizontally, feeding the article forward the distance required for each stitch.

The manner of operating the hook which forms the loop for the stitch will now be described:

To one side of the arm I, which projects down from the plate C, is attached, by a screw and nut, $l$, a block, $p$, Fig. 6, and dotted in Fig. 2, part of which projects at right angles from the arm. To this block is attached, by a screw and slot at $r$, a bent bar or arm, L, Fig. 6, the end of which is bent over and formed into a pointed hook, as seen at S. This bar plays between a block, $t$, and the plates C, to which the block is attached. Both the up and down and the sidewise motion of the hook are imparted to it by a cam-block, M, which is attached to the lower branch of the arm D, and is formed, as shown in Fig. 5, the advancing edge $x$ of the block bearing against the pin $v$ and giving the forward motion to the hook, while the side of the block, which is suitably formed for the purpose as at $t$, Fig. 5, presses against the side of the bar L and imparts the sidewise movements to the hook. Both the forward and the sidewise motions of the hook are imparted to it by the vertical vibration of the block M. The hook is retracted by the spring P.

I am aware that the angularly-slotted plate has been employed in combination with other devices in the patent of Daniel Harris for operating the feed in sewing-machines. I therefore do not claim this device. My method avoids the necessity of using any intermediate device to operate the feeding-foot; but What I do claim as my invention, and desire to secure by Letters Patent, is—

1. The arrangement of the adjustable slotted plate H in the manner described and for the purposes specified.

2. The arrangement and combination of the double cam-block M with the looper L substantially as described and for the purpose specified.

JOSHUA GRAY.

Witnesses:
P. E. TESCHEMACHER,
THOS. R. ROACH.